US006363989B1

(12) United States Patent
Phelps et al.

(10) Patent No.: US 6,363,989 B1
(45) Date of Patent: Apr. 2, 2002

(54) ANTI-TACK BLADDER

(75) Inventors: Kenny L. Phelps, Conway; Kenneth J. Reece, Benton, both of AR (US)

(73) Assignee: Pirelli Pneumatici S.p.A. (IT)

( * ) Notice: Subject to any disclaimer, the term of this patent is extended or adjusted under 35 U.S.C. 154(b) by 0 days.

(21) Appl. No.: 09/243,071

(22) Filed: Feb. 2, 1999

(51) Int. Cl.$^7$ ............................................. B29D 30/26
(52) U.S. Cl. ................................... 156/401; 156/394.1
(58) Field of Search .............................. 156/394.1, 401, 156/421.4, 537; 425/52; 525/344

(56) References Cited

U.S. PATENT DOCUMENTS

| | | | |
|---|---|---|---|
| 3,993,607 A | 11/1976 | Florence | |
| 4,141,878 A | 2/1979 | Coran et al. | 260/33.6 |
| 4,302,274 A | 11/1981 | Enders | |
| 4,359,340 A | 11/1982 | Comper et al. | |
| 4,381,331 A | 4/1983 | Johnson | 428/224 |
| 4,534,812 A | 8/1985 | Fukui et al. | 156/132 |
| 4,790,365 A | 12/1988 | Sandstrom et al. | |
| 4,853,069 A | 8/1989 | Williams et al. | 156/401 |
| 5,104,477 A | 4/1992 | Williams et al. | 156/401 |
| 5,213,823 A | 5/1993 | Hunt | 425/521 |
| 5,250,142 A | 10/1993 | Weimer et al. | 156/401 |
| 5,385,459 A | 1/1995 | Graves et al. | 425/52 |
| 5,552,483 A | 9/1996 | Hergenrother et al. | 525/90 |
| 5,593,701 A | 1/1997 | Graves et al. | 425/52 |

FOREIGN PATENT DOCUMENTS

| | | |
|---|---|---|
| CA | 253193 | 9/1925 |
| CA | 910177 | 9/1972 |
| EP | 178411 A1 | 4/1986 |
| EP | 344019 A3 | 11/1989 |
| EP | 0 413 305 A1 | 2/1991 |
| FR | 1359155 | 3/1964 |
| GB | 1040271 | 1/1963 |
| JP | 1-253439 | 10/1989 |
| JP | 1-272451 | 10/1989 |
| JP | 2-72944 | 3/1990 |

OTHER PUBLICATIONS

European Patent Office, Standard Search Report dated Mar. 25, 1999, 3 pages.
American Society for Testing and Materials. Designation: D 2084–95 "Standard Test Method for Rubber Property–Vulcanization Using Oscillating Disk Cure Meter"—11 pages.
Edited by Robert F. Ohm, Vanderbilt Rubber Handbook, 13 ed., published by the R.T. Vanderbilt Co., of Norwalk, CT, (1990). Compounding Materials—pp. 275–289.
Edited by Robert F. Ohm, Vanderbilt Rubber Handbook, 13 ed., published by the R.T. Vanderbilt Co., of Norwalk, CT., (1990). Physical Properties of Vulcanizates—pp.518–541.
Edited by Robert F. Ohm, Vanderbilt Rubber Handbook, 13 ed., published by the R.T. Vanderbilt Co ., of Norwalk, CT., (1990). Oscillating Disk Curemeter—pp. 554–558.
Edited by Robert F. Ohm, Vanderbilt Rubber Handbook, 13 ed., published by the R.T. Vanderbilt Co., of Norwalk, CT., (1990). HYPALON Synthetic Rubbers—pp. 752–758.
European Patent Office, Standard Search Report dated Jun. 14, 1999, 3 pages.
By G. M. Bristow and W. F. Watson, The British Rubber Producers' Research Association, Welwyn Garden City, Herts. "Cohesive Energy Densities of Polymers", pp. 1731–1741.

*Primary Examiner*—Geoffrey L. Knable
(74) *Attorney, Agent, or Firm*—St. Onge Steward Johnston & Reens LLC

(57) ABSTRACT

A bladder with an anti-tack rubber having suitable curing properties to turn up plies in manufacturing pneumatic tires is provided. In a preferred embodiment, the anti-tack rubber comprises 50 to 45 parts natural rubber cured with 50 to 60 parts chlorosulfonated polyethylene, 0.9 to 1.1 benzothaizyl disulfide and 0.9 to 1.1 phenylenediamine. A method of making the anti-tack rubber comprises mixing a first rubber and an anti-tack composition and blending curing agents to form a workable anti-tack rubber with suitable curing properties. An improved and simplified method to form a bladder with suitable anti-tack and curing properties, and a method for using a bladder to turn plies in manufacturing pneumatic tires, wherein the bladder is made from an anti-tack rubber is also disclosed.

2 Claims, 3 Drawing Sheets

ANTI-TACK BLADDER

FIELD OF THE INVENTION

The invention relates primarily to an anti-tack bladder made with an anti-tack rubber for use with an apparatus for manufacturing pneumatic vehicle tires, more specifically with inflatable rubber bladders conventionally used to turn ply ends over a tire bead ring and against tire plies on a tire building mandrel. Methods for making and using an anti-tack bladder and an anti-tack rubber are provided.

BACKGROUND OF THE INVENTION

Tire building or assembly machines (TAMS) conventionally use rolling inflatable rubber bladders to turn up plies of rubber material that have been wrapped around a tire building mandrel, a type of rotating collapsible drum. The bladder is known as a turn-up bladder and serves to turn up the plies over a bead formed from wire cables embedded in a tough hard rubber. The rubber ply material is tacky by nature to allow the turned up plies to stick together to form the side wall of the tire. The turn-up bladders are conventionally made of various elastomeric materials such as vulcanized rubber, natural (cis-1,4-polyisoprene) and/or synthetic rubber (i.e., styrene-butadiene) or mixtures thereof. The turn-up bladders will often stick to the uncured or partially cured plies when they are rolled over the beads to form part of the tire as they are inflated, typically, with compressed air. This adhesion slows the turn-up process by impeding the retraction of the deflated turn-up bladder and also results in decreased turn-up bladder life due to erosion caused by such adhesion to the plies.

U.S. Pat. No. 4,381,331 (Johnson) discloses a solution to the above tacking problem by having a ply turn-up bladder with at least a portion of its outer surface comprising a fabric layer of spaced cords calendered, (i.e., rolling a rubber compound into the fabric on multi-roll calender machines) with a coating of unvulcanized, uncured rubbery polymer partially embedded in the rubbery polymer surface. The spaces between such cords are free of the polymer so the cords can project above this polymer surface. This arrangement allows the polymer-free cords to contact the tacky plies, thereby reducing its adhesion to the turn-up bladder. The disadvantage of this solution are the complex finishing steps associated with preparing this outer fabric layer, such as a separate heating step to additionally cure a separately applied coating, and abrading the surface of the cords to remove some of the cured polymer to expose them. Consequently the Johnson bladder is costly to make.

U.S. Pat. No. 5,213,823 (Hunt) discloses a turn-up bladder made with a high release outside layer bonded to a core sulfur-cured rubber base, wherein the outside layer is cured in a conventional manner. The high release layer is formed from a mixture or blend of polyvinyl chloride and acrylonitrile-butadiene rubber, with a plasticizer and conventional rubber compounding ingredients. One example of a polyvinyl chloride and acrylonitrile-butadiene rubber blend that has been used is "Paracil OZO" 50, manufactured by Uniroyal, Inc. of Middlebury, Conn., USA, further described in U.S. Pat. No. 3,993,607 (Florence).

Yet another solution to the ply end tacking problem is to apply a coating to the turn-up bladder itself, such as a spray coat disclosed in U.S. Pat. No. 4,359,350 (Comper). The described coating is an aqueous lubricant containing polydimethylsiloxane, a silane, a surfactant, and optionally, a metal salt of an organic acid.

U.S. Pat. No. 5,104,477 (Williams) discloses a method to apply a surface coating of controlled release characteristics to a turn-up bladder comprising the steps of applying a releasing composition, removing a vehicle to form an adhering film, and curing the film to form the exposed release coating. The composition of the release coating is disclosed as comprising a chlorosulfonated polymer, a reinforcing filler, a green tack agent, and inert volatile solvent/diluent viscosity reducing vehicles. HYPALON, chlorosulfonated polyethylene, manufactured by E.I. duPont de Nemours and Co., of Wilmington, Del. is disclosed as a suitable chlorosulfonated polymer. Typical reinforcing fillers are carbon black, silica, fumed silica, silica dioxide and various clays known in the art, which can be used to reinforce the elastomer compositions. The green (referring to uncured, unvulcanized rubber or elastomer, not color) tack agent is typically a resin such as alkaphenol/formaldyhyde, chlorinated paraffin resins, poly(beta) terpene resins, and other resins disclosed in U.S. Pat. No. 5,104,477. Chemical curing systems are also added to the releasing composition and include sulphur-based systems containing conventional amounts of nitrogen-containing accelerator and activators known in the art. Additionally, metallic oxides such as litharge, magnesia, and sulphur bearing organic compounds and epoxy resins can be used. Typical inert, viscosity-reducing solvent/diluent vehicles are composed of organic liquids having a normal boiling point between 20–200 deg. C. These solvent vehicles function to solublize or disperse the releasing composition to enable its application as a thin film on the turn-up bladder.

One problem to be solved is that of designing an anti-tack bladder avoiding the need to coat an anti-tack material onto the surface of an already formed bladder, which would comprise an additional and more complex preparation step in manufacturing the bladder. In particular, the problem to be solved is that of departing from the use of a thin film composite to cover the bladder surface: as a matter of fact, the film(s) must be uniform and able to withstand fractures, while at the same time providing sufficient flexibility, with good adhesion to the bladder and with the ability to properly control adhesion to the ply. The production of such a film is problematic and furthermore, the curing of a film of this kind on a bladder surface is a very complex step.

Yet another problem to be solved is that of avoiding the use of the additional hazardous materials and solvents which are involved in forming a vehicle to apply the coating; such materials can in fact, pose increased environmental processing costs, as well as storage and handling safety risks.

What is desired, therefore, is an inflatable bladder with reduced adhesion to a ply, improved flexibility, better fracture resistance, all without the need to form such a material with an involved multi-step process requiring abrading, applying a separate coating material (such as a liquid, paste, or gel-like material), removal of a solvent vehicle, or depositing a final uniform coating to form the bladder's anti-tack properties.

What is also desired, therefore, is an inflatable bladder with suitable curing and anti-tack properties for use with an apparatus for manufacturing pneumatic tires. Suitable anti-tack properties in tire manufacturing allow for quick, unimpeded release of green, cured and partially cured rubber from elastomeric structures such as flexible bladders, bags, diaphragms, sleeves, and the like. Suitable curing properties of rubber used in a bladder include high durability, good cut resistance and rebound suitable for repeated inflation and deflation cycles characteristic in pneumatic tire manufacturing. The inflatable bladder should exhibit suitable curing and anti-tack properties without any visible cracking, peeling or erosion of the anti-tack bladder body under operating conditions and parameters associated with pneumatic tire manufacturing, such as capacity, bladder life, operating pressure and/or cycle time. When a rubber material is provided with such anti-tack and curing properties the bladder can be directly manufactured from, this allows a bladder to be formed without the need of additional processing steps to impart such anti-tack properties thereby simplifying production while reducing the potential for tire manufacturing down time.

SUMMARY OF THE INVENTION

Accordingly, it is an object of the invention to provide an inflatable bladder with suitable anti-tack properties for use in pneumatic tire manufacturing which is relatively simple in construction, and comprises an anti-tack rubber the body of the bladder can be manufactured from.

Another object of the invention is to provide an anti-tack rubber with suitable anti-tack and curing properties which allow for unimpeded release of green, cured and partially cured rubber from elastomeric structures such as flexible bladders, bags, diaphragms, sleeves, and other applications which benefit from a curable rubber with anti-tack properties.

A further object of the invention is to provide an anti-tack rubber with suitable curing properties which diminishes the risk that the anti-tack composition will wear off due to erosion, cracking or fracture when used with an inflatable bladder under operating conditions associated with pneumatic tire manufacture.

Another object of the invention is to provide an anti-tack rubber having sufficient tack to adhere to the ply-ends used in conventional tire manufacture without adhering to a turn-up bladder such that the turn-up bladder is eroded by contact with the ply-ends.

Yet another object of the invention is to provide a method to make an anti-tack rubber capable of achieving the above objects which mixes at least a first rubber and an anti-tack material in a single step.

Still another object of the invention is to provide a method to make an inflatable bladder capable of achieving the above objects that comprises forming an anti-tack rubber into a first ply and adhering the first ply to an elastomeric material as part of a complete bladder manufacturing process.

Another object of the invention is to provide a method to make an inflatable bladder capable of achieving the above objects that is simpler, more efficient, and environmentally benign without the need for a multi-step curing process requiring direct coating, depositing and removing a vehicle on the bladder.

Yet another object of the invention is to provide a method to use an inflatable bladder capable of achieving the above objects that comprises inflating, contacting and deflating a bladder with an anti-tack rubber that releases from contact with cured, partially cured, or uncured tire rubber with inherently less risk of eroding, cracking or peeling. Other objects of the invention will be obvious and may in part appear hereinafter.

These and other objects are achieved by the present invention which provides: an inflatable bladder comprising a body made of an anti-tack rubber, a method to make an anti-tack rubber, a method to make an inflatable bladder with suitable anti-tack and curing properties for manufacturing pneumatic tires, and a method to use an inflatable bladder with an anti-tack rubber in manufacturing pneumatic tires and turning tire plies over a bead ring.

The inflatable bladder according to the invention comprises: an elastomeric material having an outer surface, wherein at least a portion of said outer surface comprises an anti-tack rubber, said anti-tack rubber containing a blend of a first rubber and an anti-tack composition, wherein said anti-tack rubber has suitable curing and anti-tack properties for use with an apparatus for manufacturing pneumatic tires.

A method to make an anti-tack rubber according to the invention comprises: combining a first rubber and a chlorosulfonated polyethylene; adding fillers, reinforcing agents, processing aids, and plasticizers; blending into the mix cross-linking agents, metal oxides, cure accelerators, and cure activators to form said anti-tack rubber with suitable curing properties for use with an inflatable bladder in manufacturing pneumatic tires; and forming the anti-tack rubber into a separate workable ply. More preferred blends of the anti-tack rubber contain 50 to 45 parts of a natural rubber cross-linked with 55 to 60 parts of a chlorinated polyethylene, 0.9 to 1.1 parts of phenylenediamine, and 0.9 to 1.1 parts of benzothiazyl disulfide.

The invention in one of its aspects also provides a method to make an inflatable bladder with suitable curing and anti-tack properties for manufacturing pneumatic tires. Such a method comprises the steps of: mixing at least a first rubber and a anti-tack material to form an anti-tack rubber, forming the anti-tack rubber into a ply, and adhering the anti-tack rubber to an elastomeric material of the inflatable bladder. In another embodiment, the inflatable bladder can be made entirely from a ply of the anti-tack rubber.

In another aspect, the invention provides a method to use an inflatable bladder in tire manufacturing comprising the steps of: inflating the bladder having an anti-tack rubber; contacting a rubber tire material with the bladder, and deflating the bladder with suitable cure and anti-tack properties so as to release from contact with the rubber tire material upon deflation.

In another embodiment, the invention provides a method to use the inflatable bladder specifically for turning tire plies over a bead ring comprising cycles of; wrapping tire plies on a tire building drum; positioning bead rings on the tire building drum; inflating the bladder to turn the tire plies over the bead rings; and deflating the bladder containing an anti-tack rubber with suitable cure and anti-tack properties so as to release from the tire plies upon repeated deflation cycles.

The invention and its particular features will become more apparent from the following detailed description considered with reference to the accompanying drawings and example.

DETAILED DESCRIPTION OF THE INVENTION

Figure 1:
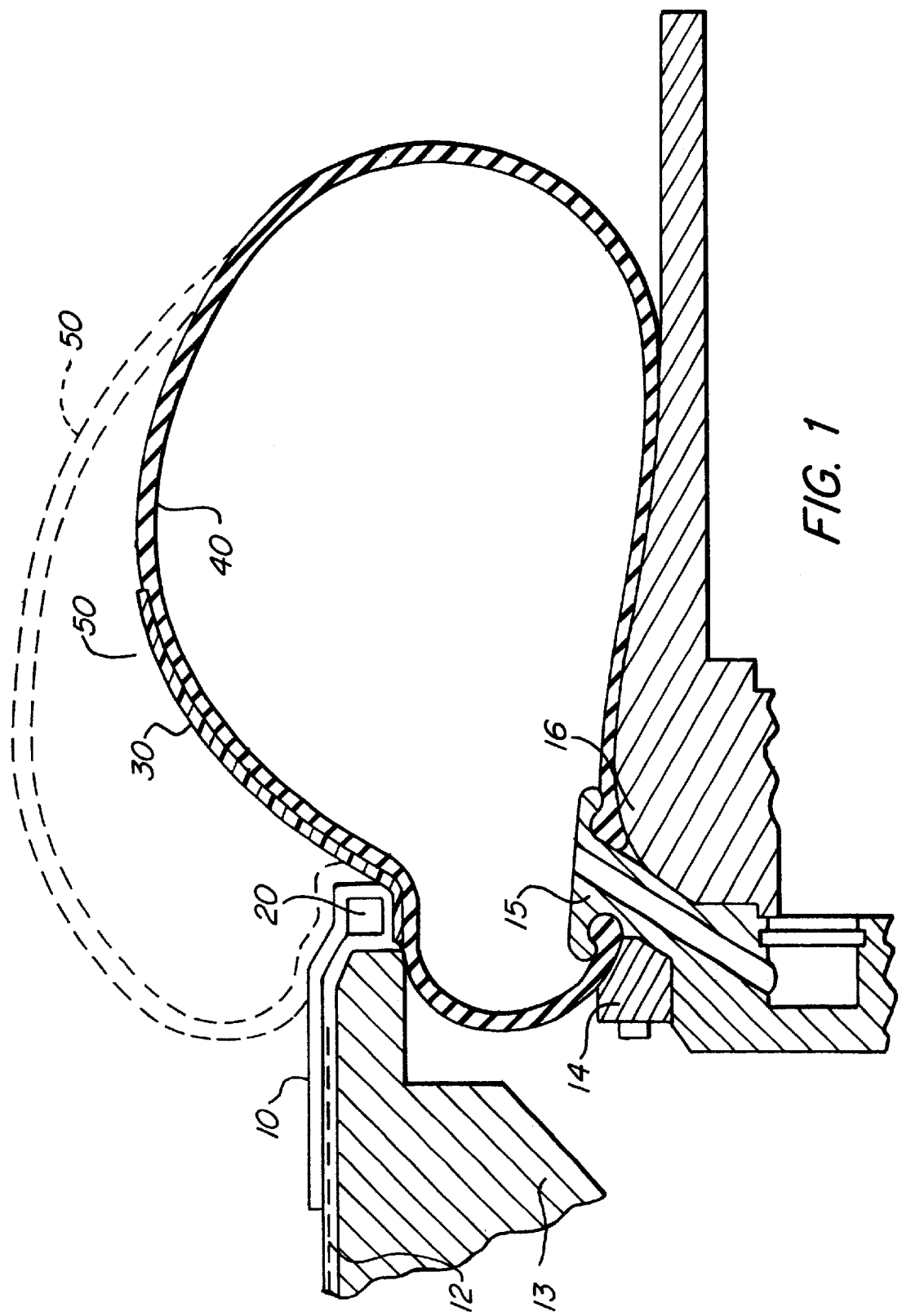
FIG. 1 is a schematic cross-section showing a tire building machine using a rolling anti-tack bladder to turn tire plies up and around a bead ring where the bladder is shown in a partially deflated state released from the tire plies after the plies have been turned around a bead ring. The bladder is shown in an alternative inflated state.

FIG. 1 depicts an anti-tack bladder 50 comprising an anti-tack rubber 30 and an elastomeric bladder material 40, shown in a partially deflated state, mounted on a tire building machine having a drum or mandrel 13. One edge of the bladder 50 is clamped between mounting rings 14 and 15, the other edge of bladder 50 is clamped between mounting rings 15 and 16. The body of a tire ply, ply body 12 is shown wrapped around the mandrel 13. A bead ring 20 is then positioned on the mandrel 13. The anti-tack bladder 50 is shown in a partially deflated state and released from tire ply 10 after bladder 50 has folded tire ply 10 around tire bead ring 20 and against ply body 12. When the anti-tack bladder 50 is inflated, as shown by the position of the broken lines, it folds a tire ply 10 over and around the tire bead ring 20 and against the ply body 12. A cycle for turning the tire ply 10 up and around bead ring 20 is complete upon deflation and release of the anti-tack bladder 50 from the tire ply 10. A new cycle starts upon inflation of the anti-tack bladder 50 to turn another ply up and around bead ring 20.

Figure 2:
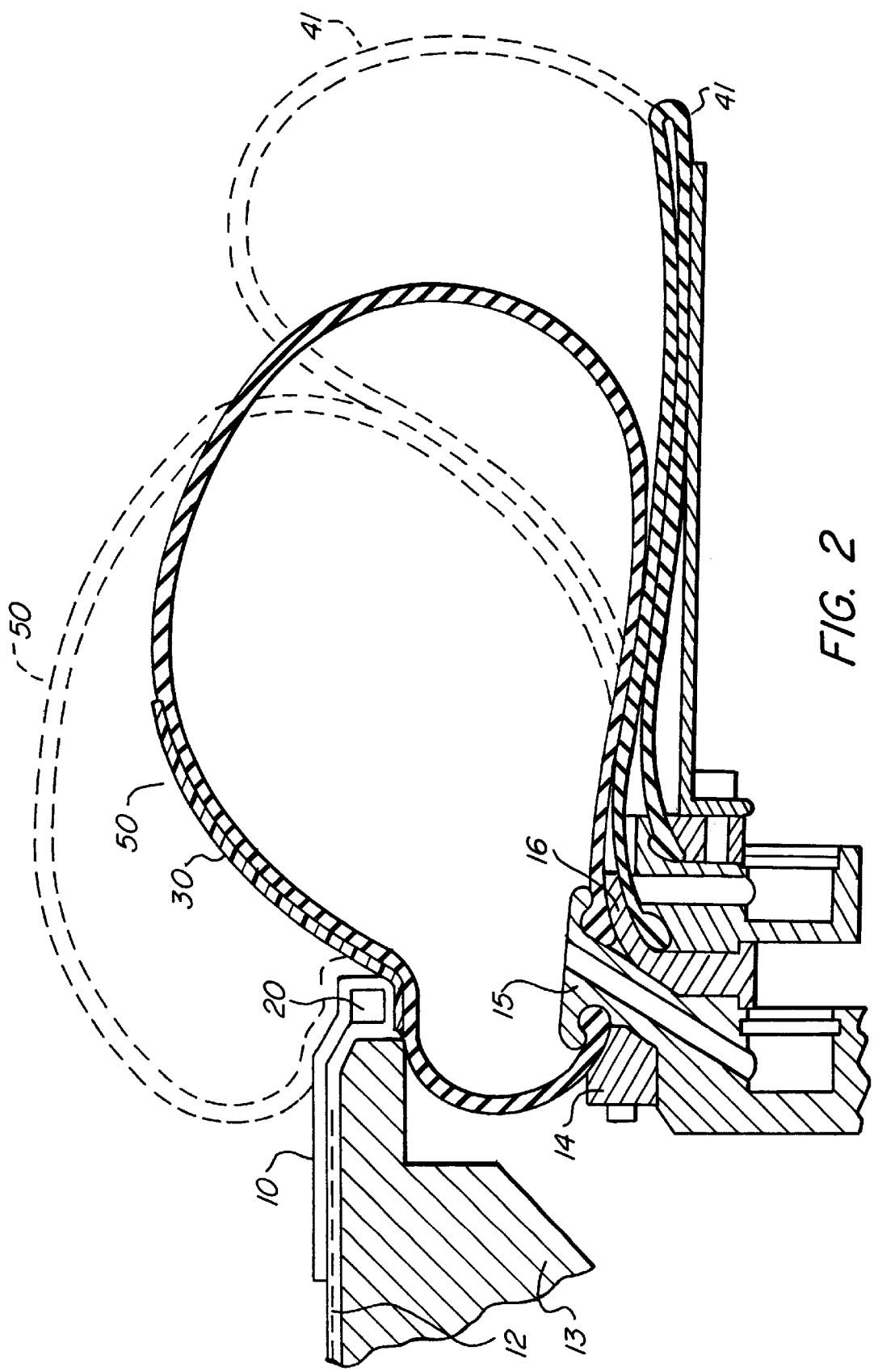
FIG. 2 is a schematic cross-section showing an alternative embodiment of a tire building machine using two rolling bladders to turn tire plies up and around a bead ring showing a first anti-tack bladder in a partially deflated state released from the tire plies, and a second bladder in a deflated state. The second bladder functions to aide in turning up the first bladder. The bladders are shown in an alternative inflated state.

FIG. 2 depicts another embodiment of the present invention using an anti-tack bladder 50 with another bladder 41 on a tire building machine. Bladder 50 performs the same function as bladder 50 in FIG. 1, however bladder 41 is not an anti-tack bladder and serves to push anti-tack bladder 50, which in turn contacts tire ply 10, up and over tire bead ring 20. FIG. 2 shows anti-tack bladder 50 in a partially deflated state, released from tire ply 10 after anti-tack bladder 50 has folded tire ply 10 around tire bead ring 20 and against a ply body 12. FIG. 2 also shows bladder 41 completely deflated and alternatively, as shown by the position of the broken lines, in an inflated state pushing up anti-tack bladder 50.

Figure 3:
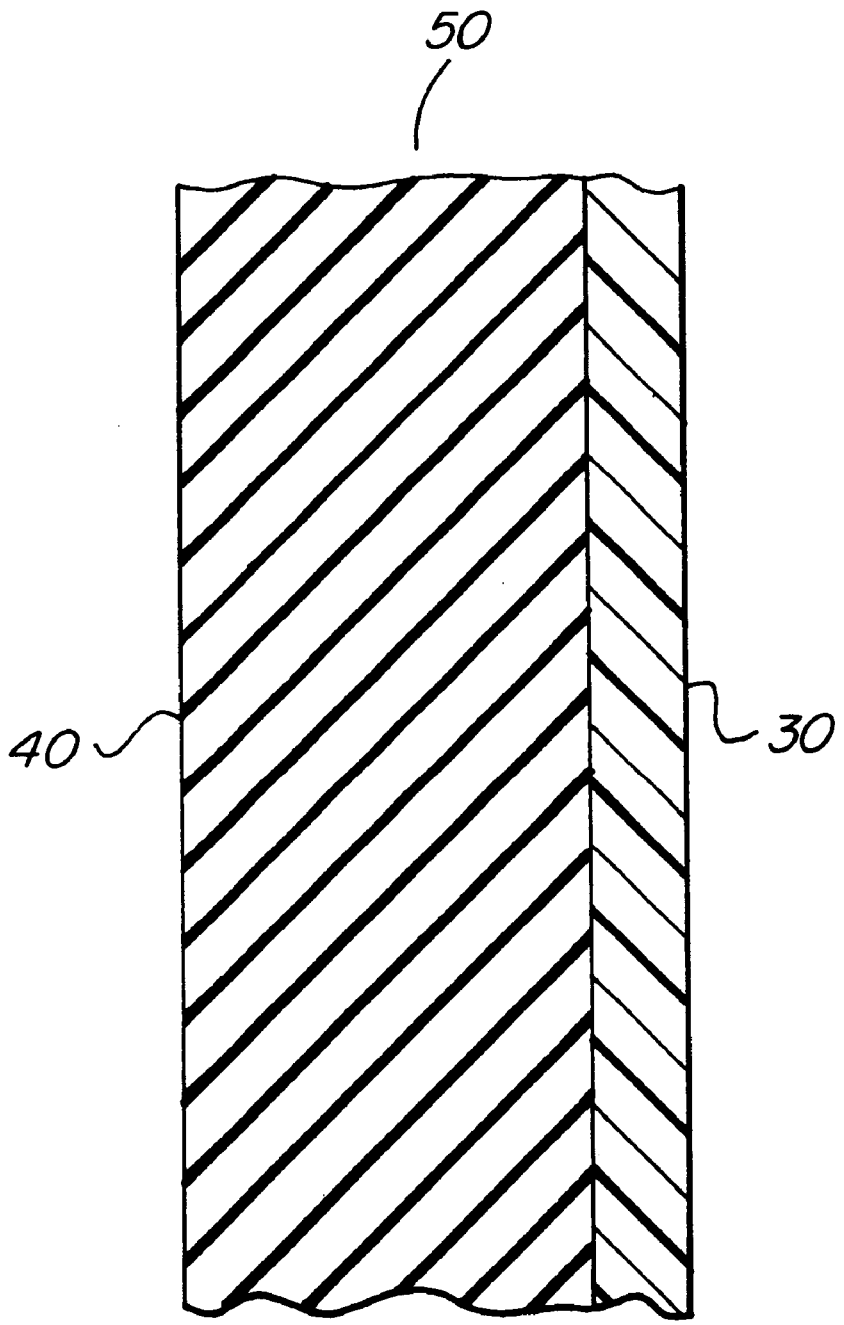
FIG. 3 is a schematic cross-section showing an alternative embodiment of the inflatable anti-tack bladder of this invention where the anti-tack rubber forms a separate ply adhered to the body of the bladder.

FIG. 3 shows a particular embodiment of an anti-tack bladder 50 of the invention comprising an anti-tack rubber 30 adhered to an elastomeric bladder material 40 to form the body of an inflatable anti-tack bladder.

One of the advantages of the anti-tack bladder of the present invention is that, because an anti-tack composition is blended with a first rubber, forming an anti-tack rubber 30, there is no need to apply a coating material (such as a liquid, paste, or gel-like material) to an elastomeric compound that forms the bladder body in order to achieve suitable anti-tack and cure. properties for manufacturing pneumatic tires. The anti-tack composition is blended with the first rubber to form a separate and new anti-tack rubber and therefore there is no need for a multi-step curing process requiring direct coating of the bladder body or depositing the anti-tack composition with a solvent or viscosity reducing vehicle to form an anti-tack coating or layer. As such, the anti-tack rubber that results from the present invention can form a separate workable rubber ply. This then eliminates additional processing steps from the prior art and results in a simpler, more efficient method to form an anti-tack bladder without the need of handling and using additional solvents, or coatings. The overall productivity of the bladder manufacturing process can therefore be increased, as well as providing environmental benefits from eliminating additional solvent use.

Another advantage of the anti-tack bladder of the present invention is the reduced risk the anti-tack composition will crack, peel or erode on the bladder body from contact with the sticky tire ply 10 during repeated inflation and deflation turn-up cycles, as the anti-tack bladder of the present invention is not the result of merely an anti-tack coating or layer of an anti-tack composition, but is a complete rubber formulation with anti-tack and curing properties suitable for use in pneumatic tire manufacturing. As a result, the anti-tack composition is cross-linked with a first rubber to form a single anti-tack rubber 30. The anti-tack rubber 30 resulting from this formulation exhibits suitable curing and anti-tack properties for use as a bladder body material in pneumatic tire manufacturing.

What is meant by "suitable" curing properties is as measured by using ASTM D 2084 Method for Rubber Property Vulcanization Using Oscillating Disk Cure Meter, which is hereby incorporated by reference, and displays modulus, tensile strength and elongation properties characteristic of the cure curve data disclosed in Table 2 of this specification. Such physical properties of cured rubber compounds or vulcanizates are more fully described in the *Vanderbilt Rubber Handbook* 13 ed., edited by Robert F. Ohm (Norwalk, Conn., R. T. Vanderbilt Co., Inc., 1990), pages 518–541, which is hereby incorporated by reference. Curing or vulcanization of rubber changes its physical properties and increases viscosity, hardness, modulus, tensile strength, abrasion resistance and rebound. The turn-up bladder must be composed of a rubber that has suitable physical properties associated with high durability, good cut resistance and rebound because it is characteristically subject to repeated inflation and deflation cycles in the pneumatic tire manufacturing process. One of the advantages of the present invention is that an anti-tack composition is cured with a rubber to form an anti-tack rubber with such suitable curing properties for use in manufacturing pneumatic tires, more specifically, for repeated inflation and deflation cycles as a bladder.

What is meant by "suitable anti-tack properties" is that the bladder retains its flexibility and does not exhibit visible erosion or sticking to green, cured and partially cured rubber from elastomeric structures used and observed in actual tire manufacturing. Therefore, because the anti-tack properties of the present invention are achieved from a single anti-tack rubber formulation with suitable curing properties, there is no risk the anti-tack properties will be reduced due to fracturing, cracking, peeling, or eroding of an applied anti-tack composition as with the prior art solutions.

Another advantage of the present invention where the anti-tack properties of the bladder result from a single anti-tack rubber formulation with suitable curing properties, is that there is also no risk that the flexibility, durability, and workability of the rubber bladder will be compromised. A disadvantage that the present invention overcomes is the risk that an anti-tack composition does not exhibit equivalent curing properties to the elastomeric material forming the bladder body when it is adhered as a separate layer or coating to a rubber bladder. This risk is eliminated with the anti-tack rubber 30 of the present invention because the anti-tack properties of the bladder result from a single anti-tack rubber formulation with suitable curing properties as described.

A further advantage of an embodiment of the anti-tack bladder of the present invention is that the bladder body can be constructed of the anti-tack rubber 30. This allows the bladder to be manufactured without the need to formulate a separate anti-tack material and adhere it to the bladder body, thereby saving a manufacturing step which allows increased bladder manufacturing productivity along with a bladder that is free from any potential defects from adhering a separate anti-tack material to a rubber bladder body.

Yet another advantage of the anti-tack bladder of the present invention relates to the properties associated with the formulation of an anti-tack rubber. Because the anti-tack properties of the bladder result from formulating an anti-tack rubber with suitable curing and anti-tack properties for use in manufacturing pneumatic tires as indicated by ASTM D 2084, hereby incorporated by reference, and not merely from a layer or coating of an anti-tack composition, the anti-tack bladder can be fabricated with minimal change to a plant's existing bladder manufacturing process.

In an alternative embodiment, the anti-tack bladder can be manufactured by adhering a ply ranging from about 0.030 to about 0.040 inches in thickness of the anti-tack rubber in accordance with the present invention to a bladder body 40 by means such as applying to the bladder body 40 a tackifying agent, cement, calendering, or by application as a laminate ply, such as disclosed in U.S. Pat. Nos. 5,213,823 and 5,250,142, hereby incorporated by reference, or by any other conventional means as part of a plant's existing manufacturing process to form the inflatable bladder. Typically, a conventional bladder can be formed of several rubber plies, with or without reinforcing fabric or material. Therefore, the anti-tack bladder of the present invention can retain the same conventional bladder fabrication process with simply adding another rubber ply of the anti-tack rubber 30 to adhere to any other ply or plies already comprising an elastomeric bladder material 40. Therefore, creation of the anti-tack bladder of the present invention could be performed without any new or different adhering steps if a multi-ply bladder had previously been used.

In the practice of this invention, an anti-tack bladder is formed by creating an anti-tack rubber wherein at least a portion of the bladder, e.g. the portion contacting a green tire ply, can be constructed from, as shown in FIGS. 1 and 2. This being opposed to merely coating the bladder with an anti-tack composition.

The anti-tack rubber contains a blend of a first rubber, and an anti-tack composition to provide an anti-tack rubber with suitable anti-tack and curing properties for use in pneumatic tire manufacturing. The first rubber may be a natural or synthetic rubber, or a mixture of the two. By the term natural rubber, it is meant rubber obtained from natural sources or its chemical equivalent, such as cis-1,4-polyisoprene. Examples of synthetic rubbers include rubber like polymers produced by polymerizing aliphatic, conjugated diolefins such as butadiene, isoprene pentadienes, etc. The rubbers contain unsaturated carbon chains, and such rubbers are known in the art as shown by ANSI/ASTM Standard D1418-85A, hereby incorporated by reference, where these rubbers are referred to as R rubbers and disclosed in U.S. Pat. No. 5,552,483, which is hereby incorporated by reference. Natural rubber is employed in preferred embodiments. Mixtures of rubbers may also be employed. Some of the R rubbers will have a solubility parameter of about 8.1 or less, as well known in the art.

An anti-tack composition may be a halogenated and sulfonated polymer that shows suitable anti-tacking properties as well as good strength and flexibility for use as a bladder component in pneumatic tire manufacturing. Chlorosulfonated polyethylene is the preferred embodiment for an anti-tack composition.

In a preferred embodiment, an anti-tack rubber is formed by blending a natural rubber, such as cis-1,4-polyisoprene, or a synthetic rubber such as stryrene-butadiene, or mixtures thereof, with an anti-tack composition, preferably a chlorosulfonated polyethylene that when cross-linked with the rubber, results in a formulation exhibiting suitable curing properties for use in manufacturing pneumatic tires. Anti-tack rubbers and rubber blends of this invention are processed with effective amounts of processing aids, accelerators, cross-linking and curing materials, anti-degradants, fillers and the like, to provide an anti-tack rubber with suitable curing properties for use with an inflatable bladder in manufacturing pneumatic tires.

Processing aids can include, but are not limited to, processing oils, waxes, plasticizers, preferably n-phenyl-p phenylenediamine, extenders, chemical conditioners, homogenizing agents and peptizers, such as mercaptans, petroleum and vulcanized vegetable oils, resins, rosins, and the like as known in the art. See *Vanderbilt Rubber Handbook,* 13 ed., published by the R. T. Vanderbilt Co., of Norwalk, Conn., (1990), pages 275–289, which is hereby incorporated by reference.

Accelerators include thiazole types such as MBTS (Benzoythiazyl disulfide) and MBT (Mercaptobenzothiazole), TMTD (Tetramethylthiuram disulfide), and TETD (Tetraethylthiuram disulfide). Cross-linking and curing agents include sulfur, zinc oxide, and fatty acids. Chlorosulfonated polyethylene can be cross-linked by a variety of curing systems. Curing systems based on zinc-oxide-magnesia as acid receptors are most useful. Antidegradants include antioxidants and antiozonants known in the art. Fillers include carbon black, calcium carbonates and mineral fillers such as silica and clay known to increase hardness, strength and resistance to tear or abrasion.

Some of the materials needed to prepare and practice the invention are known in the art, and in other cases can be prepared by those skilled in the art without undue experimentation. For example, chlorosulfonated polyethylene, known as HYPALON, is commercially available from E. I. duPont de Nemours and Co., of Wilmington, Del.. Such materials are described in the literature, see *Vanderbilt Rubber Handbook,* 13 ed., published by the R. T. Vanderbilt Co., of Norwalk, Conn., (1990), pages 752–758, which is hereby incorporated by reference.

Preferred forms of the anti-tack rubber are further characterized as conforming to the following analysis based on parts by weight.

TABLE 1

| COMPONENT | PREFERRED RANGE (parts) | ACCEPTABLE RANGE (parts) |
|---|---|---|
| Rubber material | 40–45 | 40–45 |
| Anti-tack material | 55–60 | 55–60 |
| Reinforcing/filler material | 34.5–40.5 | 30.0–45.0 |
| Processing oil | 2.5–3.5 | 2.0–4.0 |
| Activator | 4.5–5.5 | 3.0–5.5 |
| Plasticizer/pH control | 1.8–2.2 | 1.0–3.0 |
| Wax | 2.5–3.5 | 2.0–3.5 |
| Filler | 4.5–5.5 | 3.0–5.5 |
| Scorch inhibitor | 12–14 | 12–14 |
| Cross-linking/vulcanizing agent | 0.9–1.1 | 0.95–1.5 |
| Accelerator | 0.9–1.1 | 0.6–1.5 |

The anti-tack rubber of the invention is prepared by mixing the materials in a single step or in stages using various types of mills, blenders and mixers known in the art. For example, the rubber blend of a first rubber and an anti-tack composition can be processed with a filler wax, antidegradants, processing oil with accelerators, curing and cross-linking agents, and the remaining antidegradants added in a single stage. The single stage is the preferred embodiment, however, additional stages may involve incremental additions of the other materials described.

Example formulations of an anti-rubber used in the anti-tack bladder are set forth hereinafter.

The following example illustrates preparation of the anti-tack rubber and an anti-tack bladder of the invention. The example is presented to further illustrate and explain the present invention and should not be taken as limiting in any regard. Unless otherwise indicated in the example and elsewhere in the specification and claims, all parts and percentages are by weight. Percentages are based on 100 parts by weight of rubber, i.e., the natural rubber and the chlorosulfonanted polyethylene. Temperatures are degrees centigrade.

EXAMPLE 1

This example describes one typical composition of the anti-tack rubber of the invention. The anti-tack rubber is formed by mixing a natural rubber, cis-1,4-polyisoprene, and a chlorosulfonated polyethylene to form a mix, adding fillers, reinforcing agents, processing aids, and plasticizers. Cross-linking agents, metal oxides, cure accelerators, and cure activators are blended into the mix in a Banbury mixer until homogeneous. A compound having the following composition by parts was prepared:

| | |
|---|---|
| Natural rubber | 43 |
| Chlorosulfonated polyethylene | 57 |
| Carbon black (N660) (ASTM D1765) | 5 |
| Calcium carbonate | 32.2 |
| Processing oil | 3 |
| Zinc oxide | 5 |
| Stearic acid | 1 |
| n-phenyl-p-phenylenediamine | 1 |
| Wax | 3 |
| Titanium dioxide | 5 |
| Magnesium oxide | 13.3 |
| Sulfur | 0.96 |
| Benzothiazyl disulfide | 1 |

Cure properties are obtained using an oscillating disk rheometer, operated at 151 deg. C. and at a frequency of 100 cpm. A description of oscillating disc rheometers is found in the *Vanderbilt Rubber Handbook* 13 ed., edited by Robert F. Ohm (Norwalk, Conn., R. T. Vanderbilt Co., Inc., 1990), pages 554–558, which is hereby incorporated by reference. The cure meter procedure and standardized time v. torque values are specified in ASTM D 2084 and also described in U.S. Pat. No. 4,790,365 (Sandstrom), which are hereby incorporated by reference.

The anti-tack rubber composition prepared according to this example exhibited the following cure data summarized in Table 2.

TABLE 2

| Oscillating disk Rheometer @ 100 cpm, 151 deg. C. ASTM D 2084 | |
|---|---|
| $M_I$ | 9.3 |
| $M_L$ | 6.0 |
| $M_{H2}$ | 23.6 |
| $t_8$ | 8.1 |
| $t_{50}$ | 18.5 |
| $t_{90}$ | 46.4 |

$M_I$ = torque @ 1 min.
$M_L$ = minimum torque
$M_{H2}$ = maximum torque @ 2 min.
$t_x$ = time to x% of maximum torque.
All torque units are dn.m. Time is minutes.

Once the anti-tack rubber is formed into a ply, it is then cured to form the body of the anti-tack bladder. An uncured ply of the anti-tack rubber prepared according to Example 1 is adhered to the body of an elastomeric material known in the art to be used for making inflatable bladders for tire manufacturing. The anti-tack bladder is then made by positioning a reinforcement fabric of natural rubber calander stock on a drum of a bladder building machine. A second sheet of natural rubber calander stock is then positioned on the reinforcement fabric. Another sheet of natural rubber calander stock is then positioned on the sheet of natural rubber calander stock. The anti-tack rubber is then positioned on the natural rubber calander stock. The drum unit is then removed from the bladder building machine and cured. Curing a ply of the anti-tack rubber to form the anti-tack bladder is done with an autoclave process as known in the art, where the autoclave is operated for 50 minutes at 144 deg. C. at 80 psig.

In order to better evaluate the effectiveness of the anti-tack properties of the invention, a turn-up bladder containing an anti-tack rubber according to the formulation set forth in Example 1 was used under actual operating conditions in a tire manufacturing facility under the operating conditions summarized in Table 3.

TABLE 3

| Turn-up bladder evaluated: 14 inch size. An A70 tire building machine (Pirelli design) was used. | |
|---|---|
| Operating Pressure | Lower bladder, 22 psi |
| | Upper bladder, 8 psi |
| Cycle time | 2 min./tire |

After a period of approximately 20,000 cycles, which is the standard life of the prior art bladders, the practical results have been no visible cracking, peeling or erosion of the anti-tack bladder body of the present invention from contact with the sticky tire ply 10 during repeated inflation and deflation turn-up cycles. Furthermore during that period, the bladder of the invention did not stick to the uncured carcass plies of the worked tires.

These and other advantages which will be apparent to one skilled in the art, are clearly beneficial and enable the process of manufacturing tires, and anti-tack bladders used therein, to be carried out with reduced complexity of process without a sacrifice of quality and curing properties of an anti-tack bladder. It is understood that, while the present invention is disclosed in terms of its use in manufacturing pneumatic tires, the present invention is likewise useful in similar operations where an anti-tack rubber can be applied.

The above description is for the purpose of teaching the person of ordinary skill in the art how to practice the present invention, and is not intended to detail all those obvious modifications and variations of it, which will become apparent to the skilled worker upon reading the description. It is intended, however, that all such obvious modifications and variations be included within the scope of the present invention, which is defined by the following claims.

What is claimed is:

1. An inflatable bladder comprising;
an elastomeric material having an outer surface, wherein at least a portion of said outer surface comprises an anti-tack rubber, said anti-tack rubber containing a blend of natural rubber and chlorosulfonated polyethylene, wherein said anti-tack rubber has suitable curing and anti-tack properties for use with an apparatus for manufacturing pneumatic tires.

2. An inflatable bladder according to claim 1, wherein said anti-tack rubber forms a separate first ply, said first ply adhered to said outer surface of said elastomeric material, wherein said first ply has suitable curing and anti-tack properties for use with said elastomeric material in manufacturing pneumatic tires.

* * * * *